US006995365B2

(12) United States Patent
Farnsworth

(10) Patent No.: US 6,995,365 B2
(45) Date of Patent: Feb. 7, 2006

(54) MASS ANALYZER HAVING IMPROVED ION SELECTION UNIT

(75) Inventor: Vincent R. Farnsworth, Agoura, CA (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 10/706,324

(22) Filed: Nov. 12, 2003

(65) Prior Publication Data

US 2005/0098723 A1 May 12, 2005

(51) Int. Cl.
*B01D 59/44* (2006.01)
*H01J 49/00* (2006.01)

(52) U.S. Cl. ....................................... 250/291; 250/290

(58) Field of Classification Search ................ 250/282, 250/281, 291, 290
See application file for complete search history.

(56) References Cited

U.S. PATENT DOCUMENTS

| | | | | |
|---|---|---|---|---|
| 3,239,662 A | * | 3/1966 | Noller | 250/296 |
| 3,925,663 A | * | 12/1975 | Hiller et al. | 250/292 |
| 3,970,849 A | * | 7/1976 | Brongersma et al. | 250/281 |
| 4,208,582 A | * | 6/1980 | Arnush et al. | 250/291 |
| 4,982,088 A | * | 1/1991 | Weitekamp et al. | 250/291 |
| 5,019,706 A | * | 5/1991 | Allemann et al. | 250/291 |
| 5,726,448 A | * | 3/1998 | Smith et al. | 250/290 |
| 5,886,346 A | * | 3/1999 | Makarov | 250/291 |
| 6,521,888 B1 | * | 2/2003 | Carlson | 250/291 |
| 6,570,151 B1 | * | 5/2003 | Grosshans et al. | 250/282 |
| 6,803,569 B2 | * | 10/2004 | Tsybin et al. | 250/292 |
| 2002/0079444 A1 | * | 6/2002 | Senko | 250/290 |

* cited by examiner

*Primary Examiner*—Jack Berman
*Assistant Examiner*—Kalimah Fernandez
(74) *Attorney, Agent, or Firm*—Robert B. Polit; D. David Hill

(57) ABSTRACT

An improved mass spectrometer is set forth. The mass spectrometer comprises an ion injector that is configured to provide a plurality of ions for analysis and an ion selection unit that is adapted to receive the plurality of ions from the ion injector and provide only those ions having a selected mass-to-charge ratio for detection/analysis. The ion selection unit includes an outer electrode and a plurality of inner electrodes. The plurality of ions provided by the ion injector are accepted into the interstitial region between the outer electrode and the plurality of inner electrodes. A power supply system is connected to the electrodes of the ion selection chamber. The power supply system is adapted to provide an oscillating voltage to at least one of the plurality of inner electrodes to facilitate separation of ions of the selected mass-to-charge ratio from ions of non-selected mass-to-charge ratios.

25 Claims, 8 Drawing Sheets

MASS ANALYZER HAVING IMPROVED ION SELECTION UNIT

FIELD OF THE INVENTION

The present invention is generally directed to mass analyzers. More particularly, the present invention is directed to a mass analyzer having an improved ion selection unit and/or ion detection arrangement.

BACKGROUND OF THE INVENTION

The characteristics of mass spectrometry have raised it to an outstanding position among the various analysis methods. It has excellent sensitivity and detection limits and may be used in a wide variety of applications, e.g. atomic physics, reaction physics, reaction kinetics, geochronology, biomedicine, ion-molecule reactions, and determination of thermodynamic parameters ($\Delta G°_f$, $K_a$, etc.). Mass spectrometry technology has thus begun to progress very rapidly as its uses have become more widely recognized. This has led to the development of entirely new instruments and applications.

One type of mass spectrometer, known as an ion trap mass analyzer, is illustrated in FIG. 1. Ion trap mass analyzers are similar to quadrupole mass analyzers in that RF voltages are applied to produce an oscillating ion trajectory. The term "ion trap" is derived from the fact that the fields are applied so that ions of all mass-to-charge ratios are initially trapped, and oscillate in the mass analyzer. Mass analysis is subsequently accomplished by sequentially applying a mass-to-charge dependent matching RF voltage that increases the amplitude of the oscillations in a manner that ejects ions of increasing mass-to-charge ratio out of the trap and into the detector. This type of operation is referred to as "mass-selective instability" because all ions are retained in the fields of the mass analyzer except those with the selected mass-to-charge ratio.

Development trends in such mass analyzers have gone in the direction of increasingly complex designs requiring highly specialized components and tight manufacturing tolerances. This increased complexity frequently results in undesirable trade-offs in the size, reliability and manufacturability of the apparatus. However, such trade-offs have become increasingly intolerable in the competitive field of drug discovery and analysis. There, mass analyzers must be highly accurate, reliable and, at times, compact in design.

The present inventors have recognized that there is a need to improve existing mass spectrometer apparatus. Such existing mass spectrometer apparatus are frequently of a highly complex design and are difficult to operate. Decreased complexity can be achieved by simplifying the mass spectrometer apparatus and/or simplifying the methods used for ion selection. Such improvements can be achieved while still maintaining or exceeding manufacturing, mass resolution, and/or mass sensitivity goals.

SUMMARY OF THE INVENTION

An improved mass spectrometer is set forth. The mass spectrometer comprises an ion injector that is configured to provide a plurality of ions for analysis and an ion selection unit that is adapted to receive the plurality of ions from the ion injector and select only those ions having a selected mass-to-charge ratio for detection/analysis. The ion selection unit includes an outer electrode and a plurality of inner electrodes. The plurality of ions provided by the ion injector are accepted into the interstitial region between the outer electrode and the plurality of inner electrodes. A power supply system is connected to the electrodes of the ion selection chamber. The power supply system is adapted to provide an oscillating voltage to at least one of the plurality of inner electrodes to facilitate separation of ions of the selected mass-to-charge ratio from ions of non-selected mass-to-charge ratios based on the orbital period of ions having the selected mass-to-charge ratio.

DESCRIPTION OF ONE OR MORE PREFERRED EMBODIMENTS

Figure 1:
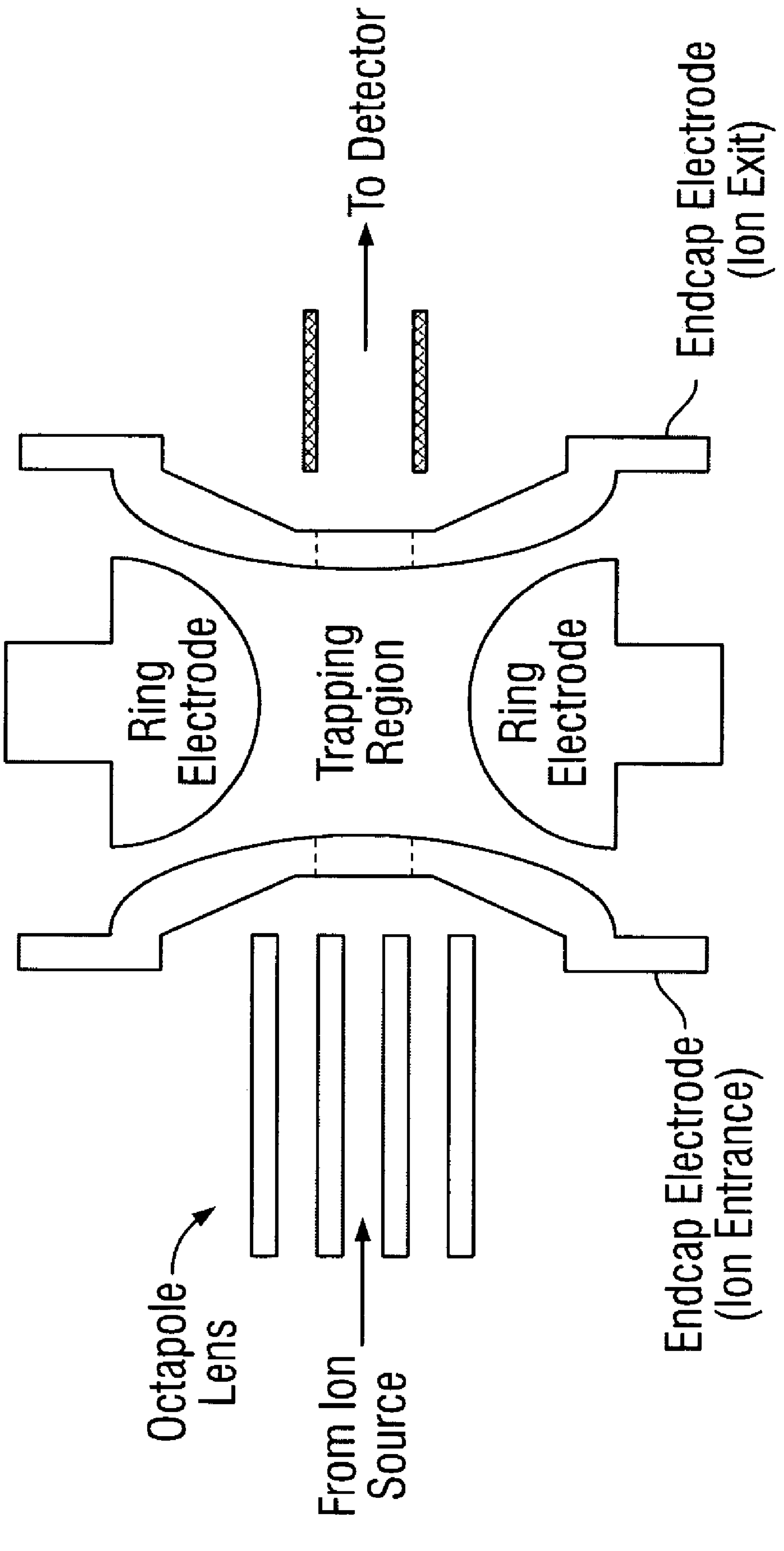
FIG. 1 (Prior Art)
FIG. 1 is a schematic diagram of an ion trap mass analyzer of the prior art.
Figure 2:
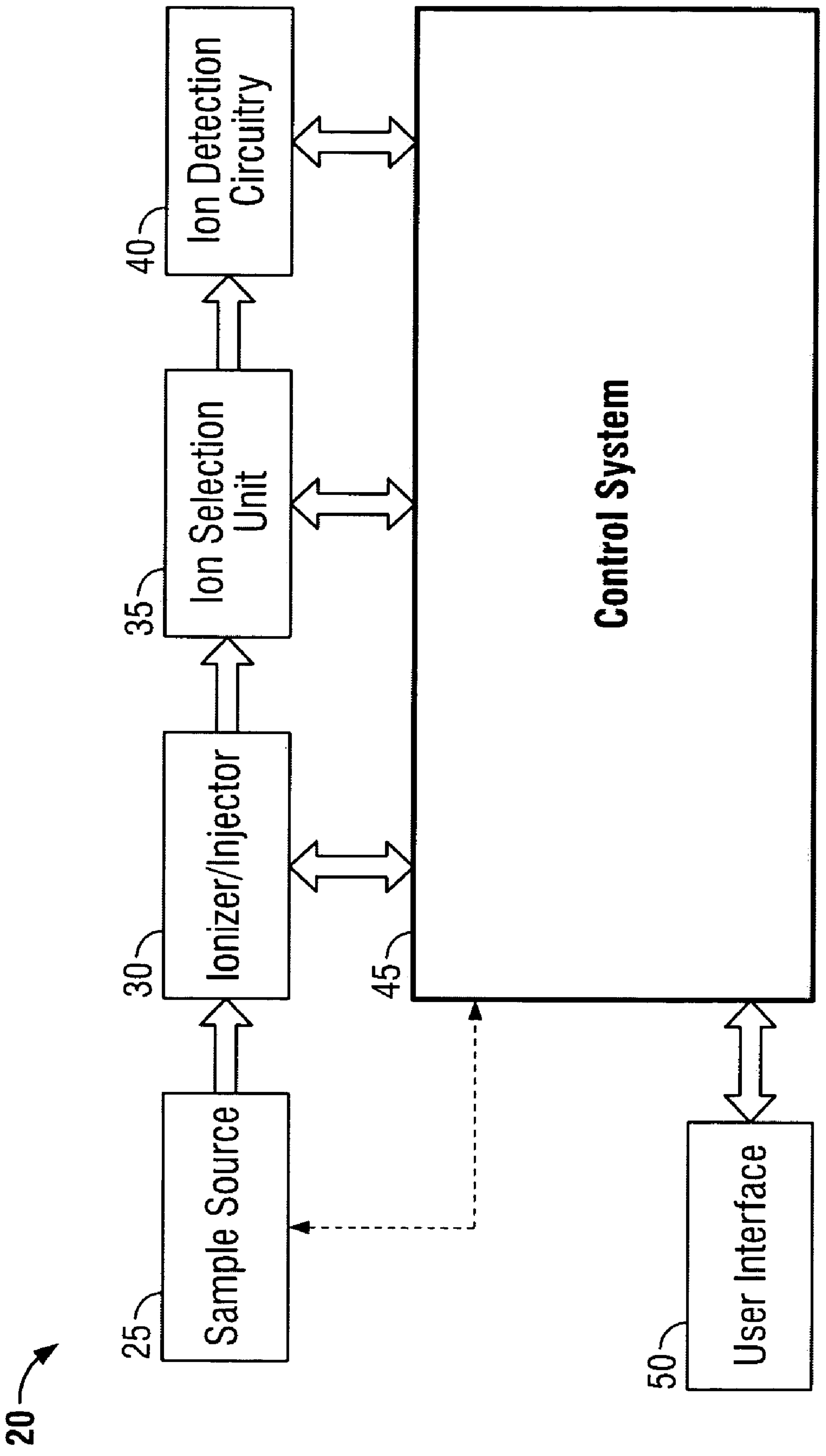
FIG. 2 is a schematic block diagram of one embodiment of a mass analysis system constructed in accordance with the teachings of the present invention.

The basic components of a mass analysis system constructed in accordance with one embodiment of the invention are shown in FIG. 2 in block diagram form. As illustrated, the mass analysis system 20 includes a sample source unit 25, an ionizer/ion injector 30, an ion selection unit 35, and ion detection circuitry 40. The components of the mass analyzer 20 may be automated by one or more programmable control systems 45. To this end, control system 45 may be used to execute one or more of the following automation tasks:

a) control of the ionization and ion injection parameters of one or more of the components of the ionizer/ion injector 30 (i.e., ion beam focusing, ion beam entrance angle into the ion selection unit 35, ion injection timing, ionization energy, ion velocity, etc.);

b) control of the electric field parameters within the ion selection unit 35;

c) control of the ion detection circuitry 40; and d) analysis of the data received from the mass analyzer 20 for presentation to a user and/or for subsequent data processing and/or analysis.

The parameters used to execute one or more of the foregoing automation tasks may be entered into the control system 45 by a human operator through, for example, user interface 50. Additionally, user interface 50 may be used to display information to the human operator for system monitoring purposes or the like. As such, user interface 50 may include a keyboard, display, switches, lamps, touch display, printers or any combination of these items.

With reference to FIG. 2, the material that is to be analyzed is provided in system 20 by the sample source unit 25. Sample source unit 25 may include a single sample outlet or multiple sample outlets (a single sample outlet is shown in the illustrated embodiment). Further, the sample source unit 25 can be configured to provide a single material type or multiple successive material types.

The sample material from the sample source unit 25 is provided to the input of the ionizer/ion injector 30. Sample source unit 25 can introduce the sample material (which includes the analyte) to the ionizer/ion injector 30 in several ways, the most common being with a direct insertion probe, or by infusion through a capillary column. The ionizer/ion injector 30 may therefore be adapted to interface directly with whatever form the sample takes at the output of the sample source unit 25. For example, the ionizer/ion injector 30 can be adapted to interface directly with the output of gas chromatography equipment, liquid chromatography equipment, and/or capillary electrophoresis equipment. It will be recognized that any treatment of a sample material prior to the point at which sample source unit 25 provides it to the ionizer/ion injector 30 is dependent on the particular analysis requirements.

Upon receiving the sample from the sample source unit 25, the ionizer/ion injector 30 operates to ionize the molecules of the analyte included in the received sample and to inject the ionized analyte molecules, either directly or indirectly, into the ion selection unit 35. Although pulsed ionization techniques providing short, precisely defined ionization times and a small ionization region are preferable, the ionization and injection can be accomplished using any of a number of techniques. For example, one method that allows for the ionization and transfer of the sample material from a condensed phase to the gas phase is known as Matrix-Assisted Laser Desorption/Ionization (MALDI). Another technique is known as Fast Atom/Ion Bombardment (FAB), which uses a high-energy beam of Xe atoms, $Cs^+$ ions, or massive glycerol-$NH_4$ clusters to sputter the sample and matrix received from the sample source unit 55. The matrix is typically a non-volatile solvent in which the sample is dissolved. Although the ionizer/ion injector 30 is represented by a single block unit in the schematic of FIG. 2, it will be recognized that these processes can be executed by a single, integrated unit or in two or more separate units.

Figure 3:
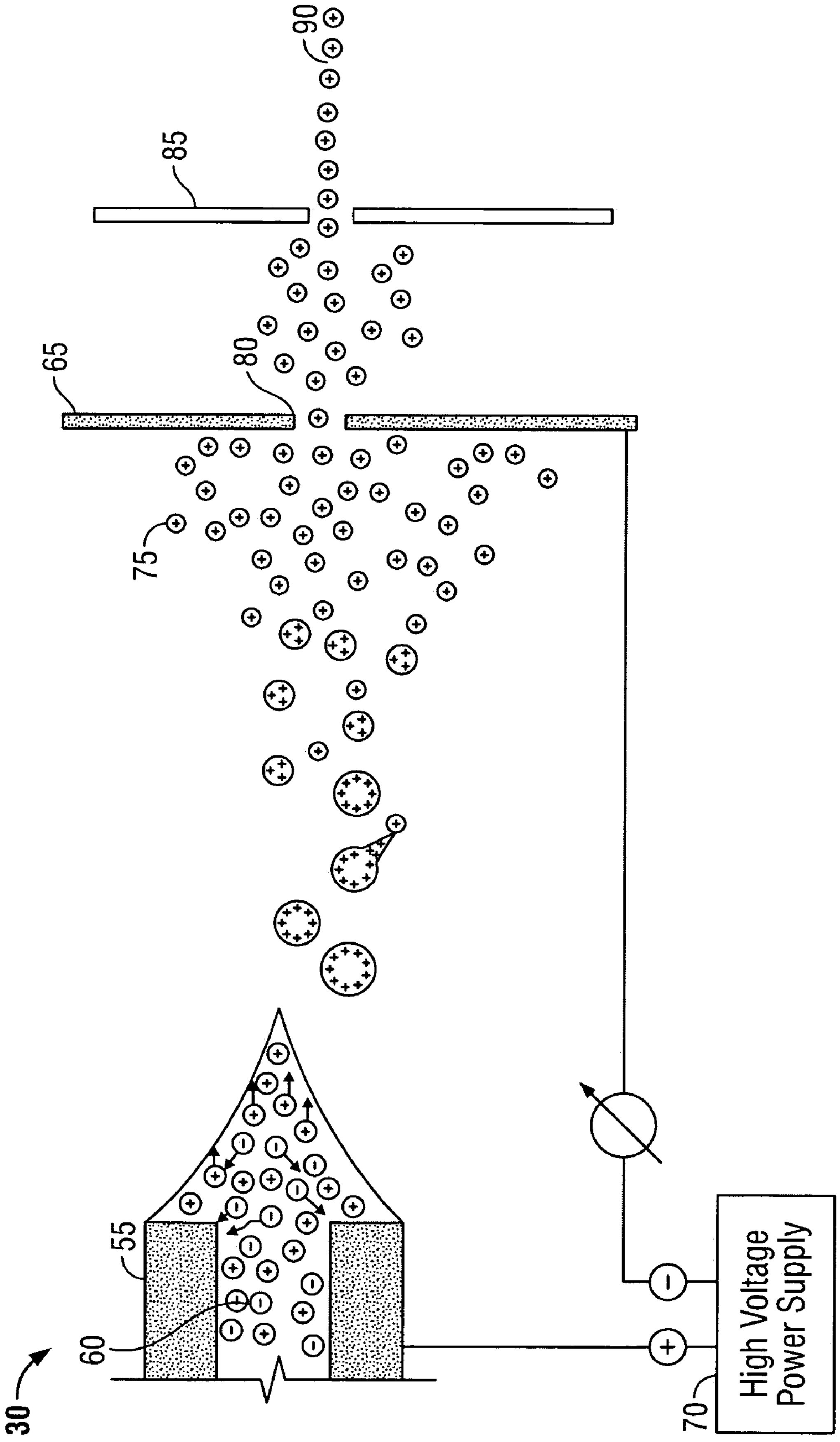
FIG. 3 (Prior Art)
FIG. 3 illustrates one embodiment of an electrospray apparatus that may be used in the mass analysis system of FIG. 2.

A still further technique that may be implemented by the ionizer/ion injector unit 30 to introduce the analyte into the ion selection unit 35 is electrospray ionization. One embodiment of a basic electrospray ionizer/ion injector unit 30 is shown in FIG. 3. As illustrated, the ionizer/ion injector unit 30 is comprised of a capillary tube having an electrically conductive capillary tip 55 through which a sample liquid 60 is provided for ionization and injection into the ion selection unit 35. The sample liquid 60 typically comprises a solvent containing an amount of the sample analyte. A counter-electrode 65 is disposed opposite the capillary tip 55 and an electric field is set-up between them by a power supply 70.

In operation, the electrically conductive capillary tip 55 oxidizes the solvent and sample analyte resulting in a meniscus of liquid that is pulled toward the counter-electrode 65. Small droplets of the liquid emerge from the tip of the meniscus and travel toward the counter-electrode 65. As the droplets make their way to the counter-electrode 65 under the influence of the electric field, the solvent tends to evaporate thereby leaving only charged gaseous ions 75 comprised of ionized analyte behind. A number of these charged gaseous ions 75 are accelerated through an orifice 80 in the counter-electrode 65 where a focusing lens 85 aligns them into a narrow ion beam 90. Preferably, focusing lens 85 is controlled to provide the narrow ion beam 90 to the ion selection unit 35 in discrete bursts where the ions are separated from one another based on their mass-to-charge ratios.

Ion selection unit 35 selects ions of a predetermined mass-to-charge ratio based on the principles of the motion of charged particles in an electric field. The charged particles in the present case are ionized molecules with one or more net charges that are received from the ionizer/ion injection unit 35. The ion charges may be positive or negative. Ions entering the device are filtered according to their mass-to-charge values. An ion of a particular mass-to-charge will be detectable when the adjustable parameters of the ion selection unit 35 are set so that ions of the selected mass-to-charge ratio achieve a stable orbital trajectory while ions that do not have the selected mass-to-charge ratio have their orbital trajectories destabilized during the ion selection process.

An ion selection unit 35 constructed in accordance with one embodiment of the present invention is illustrated in FIGS. 4–7. Generally stated, the ion selection unit 35 is comprised of an outer electrode 95 and a plurality of inner electrodes 100, 105, 110 and 115. In the illustrated embodiment, an ion inlet 120 is disposed in outer electrode 95 to accept the ion beam bursts 90 from the ionizer/ion injector 30. As will be discussed in further detail below, ionizer/ion injector 30 and ion inlet 120 are oriented with respect to one another to direct the ion beam bursts 90 along a tangent of a stable ion trajectory path 125 defined in the interstitial region 130 between outer electrode 95 and the interior electrodes 100 through 115. The ions are preferably introduced into the interstitial region 130 so that the velocity components along longitudinal axis 135 are negligible. This ensures that the ions stay within preset boundaries along the length of longitudinal axis 135 during operation of the device so that the selection process is based on the orbital frequency of the ions. One or more focusing electrodes (not shown) may also be used to generate an electric field within interstitial region 130 that restricts the motion of stray ions to such preset boundaries.

Figure 5:
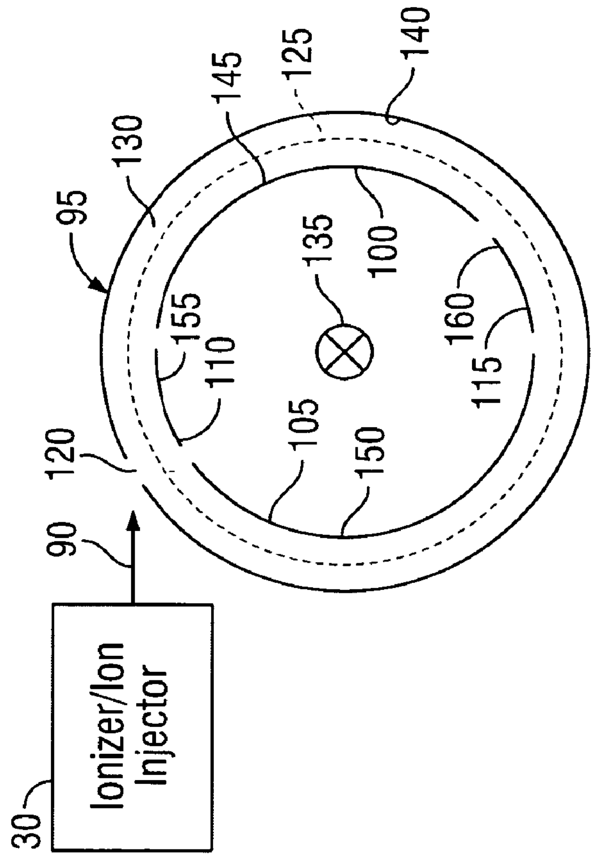
FIGS. 4 through 7 illustrate one embodiment of an ion selection unit that may be used in the mass analysis system of FIG. 2.
Figure 4:
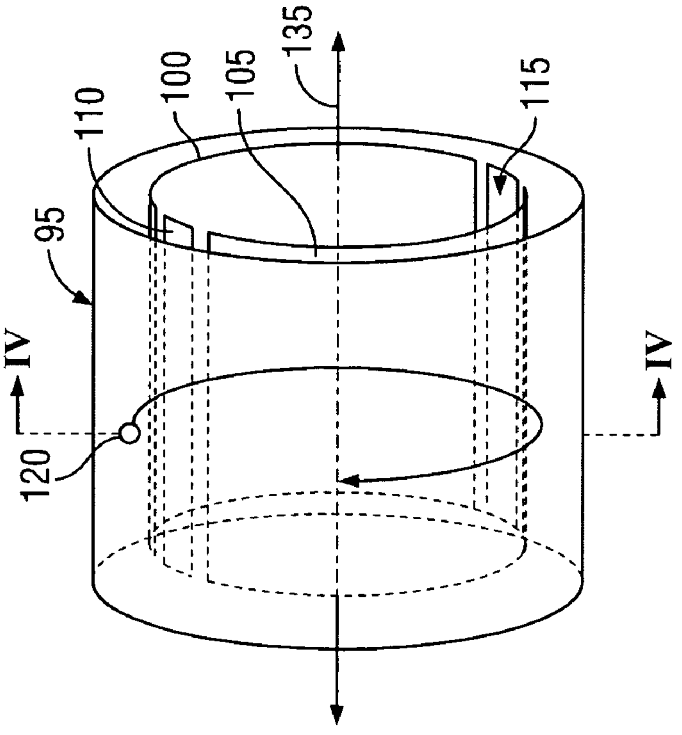
Figure 7:
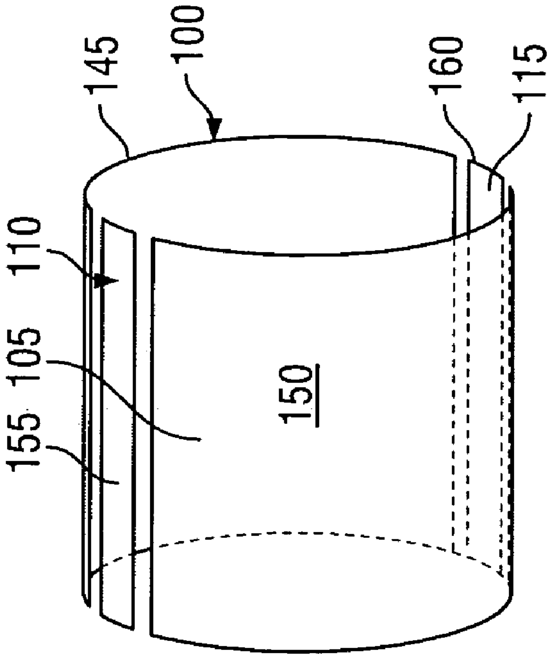
Figure 6:
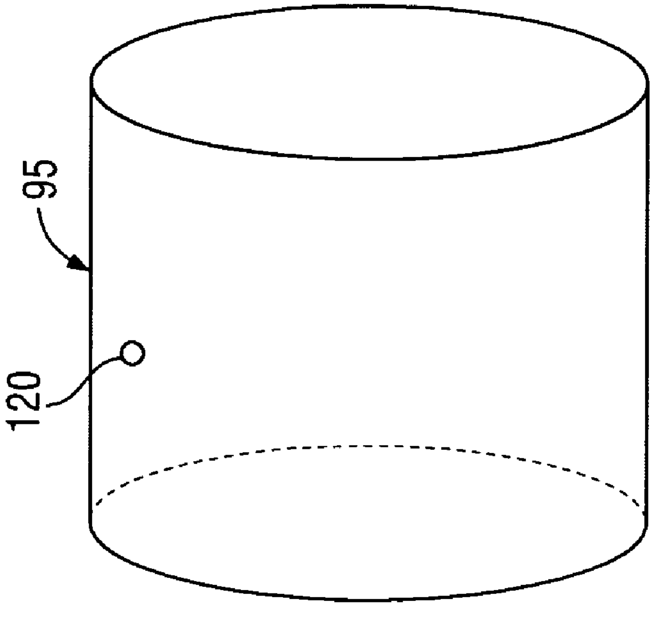

As particularly shown in FIGS. 5 and 7, the outer electrode 95 includes an interior electrode surface 140 that is generally cylindrical in shape. Interior electrodes 100, 105, 110 and 115 include exterior electrode surfaces 145, 150, 155 and 160, respectively, that are concentric with interior electrode surface 140. The interior electrode surface 140 and exterior electrode surfaces 145, 150, 155 and 160 are preferably exposed metal surfaces, but can likewise be in the form of a metal surface covered with a dielectric material, etc.

In one respect, interior electrodes 100 and 105 and their corresponding exterior electrode surfaces 145 and 150 can be viewed as a single cylindrical electrode having one or more arcuate openings along a length thereof. Electrodes 110 and 115 and their corresponding electrode surfaces 155 and 160 are disposed within these arcuate openings and are substantially coextensive with them. Although two such arcuate openings are used in the illustrated embodiment, it will we understood from the description set forth below that a single arcuate opening or a greater number of openings and corresponding electrode surfaces may be used depending on design requirements. Electrode surfaces 155 and 160 are disposed opposite one another about axis 135 and have a shorter arcuate length than electrode surfaces 145 and 150. Although electrode surfaces 145 and 150 may optionally be constructed so that they form a common electrical node (again, depending on design requirements), the remaining electrode surfaces are preferably constructed so that they are electrically insulated from one another.

Operation of the ion selection unit 35 can be understood with reference to the cross-sectional views of the unit shown in FIGS. 8 through 12. As illustrated, ions are provided from the ionizer/ion injector 30 through ion inlet 120 where they are initially directed to a stable circular trajectory path 125 in interstitial region 130 formed by the concentric electrode configuration. This initial stable circular trajectory is achieved by generating a substantially homogenous static electric field about axis 135 between the interior electrode surface 140 and exterior electrode surfaces 145, 150, 155 and 160. The kinetic energy of the ion and the strength of this static electric field determines the exact trajectory of each ion. When the kinetic energy of the ion and the strength of the static electric field are balanced, the ion will be accelerated into a stable circular trajectory such as the one shown generally at 125 and remain in orbit about axis 135 indefinitely. All ions entering the ion selection unit 35 after being directed into the static electric field will typically achieve substantially identical trajectories, regardless of their individual masses or mass-to-charge ratios. Ions with smaller mass-to-charge ratios will orbit faster than ions with larger mass-to-charge ratios, but their trajectories will be generally the same. Ions with different mass-to-charge ratios, however, will travel at different angular velocities about axis 135 and will have unique and determinable orbital periods. Ions with identical mass-to-charge ratios will travel at the same velocity and have the same orbital period. Ion selection within the ion selection unit 35 is accomplished by exploiting this phenomenon.

Figure 8:
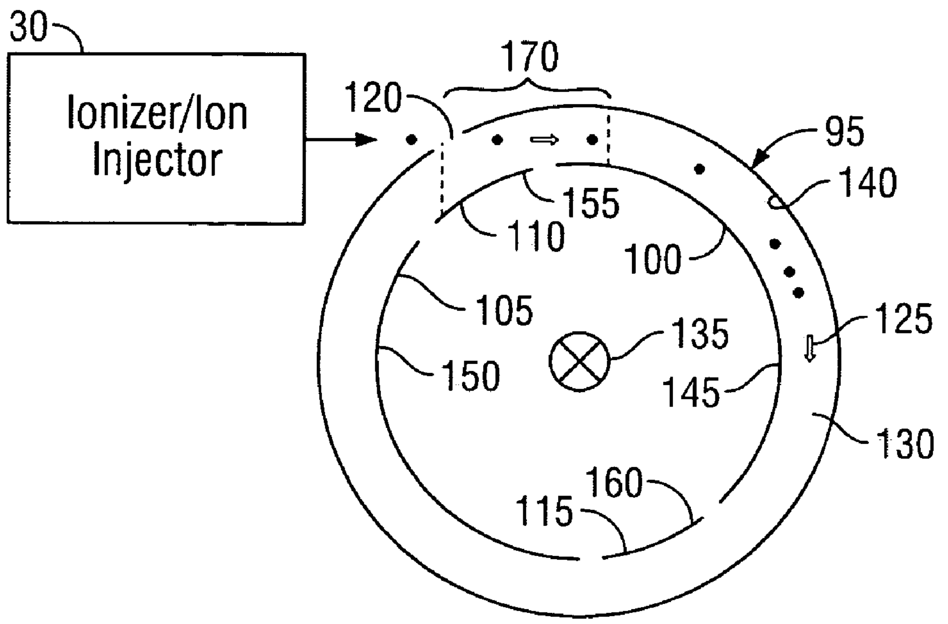
FIGS. 8 through 12 are cross-sectional views of the ion selection unit shown in FIGS. 4 through 7 illustrating the ion selection process.

In accordance with one manner of operating ion selection unit 35, the electrodes 95, 100, 105, 110 and 115 are connected to a power supply that selectively provides voltage potentials to each of the electrodes individually to generate the desired electrical field conditions in interstitial region 130. The substantially homogenous electric field is preferably generated by placing the interior electrode surface 140 at ground potential while concurrently placing the outer electrode surfaces 145, 150 and 160 at the same voltage potential with respect to one another but at a potential that is different from the potential of the interior electrode surface 140. Electrode surface 155 is initially maintained at ground potential during the ion injection portion of the process. As such, the ions pass through a short field-free region 170 after entering the ion selection unit 35 through ion inlet 120 but before they enter the region of the homogenous electric field present in the remaining portions of the interstitial region 130. In this way, the entering ions do not experience any electric field forces until they reach the region between electrode surfaces 140 and 145 where the electric field begins. This configuration allows insertion of the ions into the electric field at the desired point and concurrently prevents the ions from crashing into the electrode surfaces. Once the ions enter the generally homogenous electric field between electrode surfaces 140 and 145, the trajectory taken by each ion is tangential to the electric field This initial state in which ions of all mass-to-charge ratios are directed to a stable circular trajectory orbit about axis 135 is shown in FIG. 8.

Before the ions complete a full orbit about axis 135 and pass between electrode surfaces 140 and 155, electrode surface 155 is brought to the same electric potential as electrode surfaces 145, 150 and 160 so that the ions experience no perturbation in their trajectory as they continue to orbit in interstitial region 130. Therefore, the entry time interval is dictated by the orbital periods of the selected ions. To this end, the potential of electrode surface 155 should be altered from its initial state before ions of the selected mass-to-charge ratio complete their orbit and enter the region between electrode surfaces 140 and 155. Using an entry time set to the maximum entry time interval for ions of the selected mass-to-charge ratio will cause ions traveling at higher velocities (i.e., ions having lower mass-to-charge ratios than the selected mass-to-charge ratio) to reach the region between electrode surfaces 140 and 155 before electrode surface 155 reaches the required potential to render the electric field continuous. Consequently, these non-selected ions will typically crash into one of the electrodes. Once all four exterior electrode surfaces 145, 150, 155 and 160 have been brought to the same voltage potential, the inner electrodes 100, 105, 110 and 115 act as a continuous electrode and the electric field is generally uniform about axis 135 throughout the interstitial region 130.

Ion selection by mass-to-charge ratio is accomplished by controlling the voltage potential at exterior electrode surfaces 155 and 160. Generally stated, electrodes 110 and 115 function as destabilization electrodes that destabilize the orbital trajectories of ions having non-selected mass-to-charge ratios. More particularly, the electrode surfaces 155 and 160 are cycled between the voltage required to render the electric field in region 130 about axis 135 continuous (hereinafter, $V_{cont}$, which can represent a positive or negative potential depending on design requirements) and ground potential (i.e., the same potential as outer electrode 95) while exterior electrode surfaces 145 and 150 are maintained at $V_{cont}$. The cycled electric potentials provided at exterior electrode surfaces 155 and 160 may be out of phase with one another. For example, when exterior electrode surface 155 is at $V_{cont}$, exterior electrode surface 160 is driven to ground potential and vise versa. Preferably, the voltage is cycled by applying a switched DC voltage waveform to the electrode surfaces 155 and 160. The rate of the cycling is adjusted to coincide with the orbital period of the ions having the selected mass-to-charge ratio. Ion selection occurs when ions pass through the portions of interstitial region 130 proximate exterior electrode surfaces 155 and 160. The timing of the voltage cycling is such that the ions having the selected mass-to-charge ratio always pass through these regions when the corresponding electrode surfaces are at $V_{cont}$. The selected ions experience no perturbation in their orbit and continue in an uninterrupted circular trajectory about axis 135. Ions of all other mass-to-charge ratios orbit out of phase with respect to the frequency of the voltage waveform to electrodes 110 and 115. Eventually the ions with non-selected mass-to-charge ratios will pass over one or both of electrodes 110 and 115 when they are at ground potential. When this occurs, the non-selected ions will experience a perturbation in their orbit. Their trajectory through interstitial region 130 thus becomes unstable causing them to crash into one of the electrode surfaces.

Figure 9:
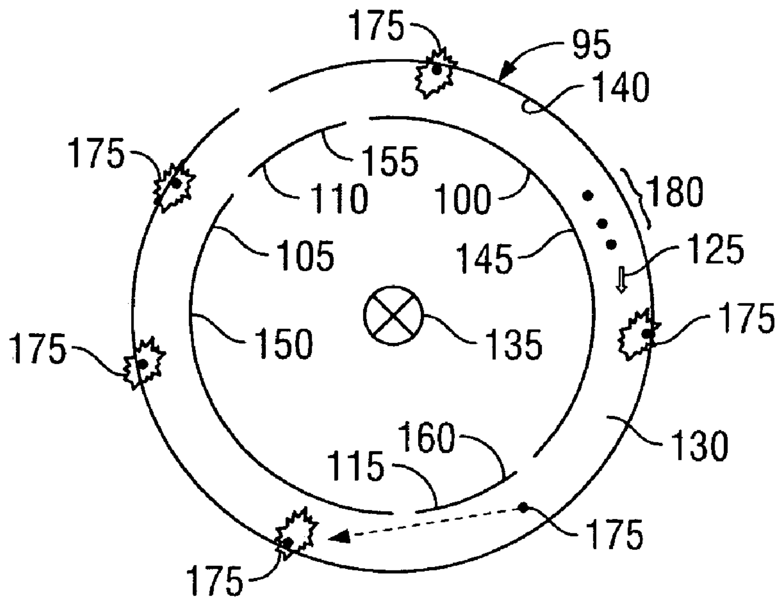
Figure 10:
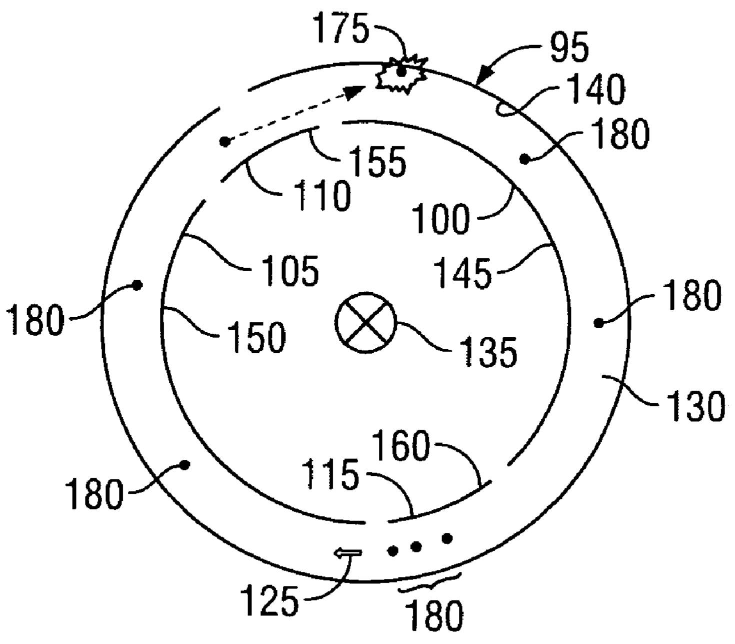

Although the illustrated embodiment employs two electrodes 110 and 115 having out of phase voltage waveforms to destabilize the orbits of ions having non-selected mass-to-charged ratios, it will be recognized that a single destabilization electrode or multiple destabilization electrodes may be used. However, having two out-of-phase electrodes 110 and 115 increases the selectivity of the unit 35. At least two out-of-phase electrodes are needed to destabilize the orbits of non-selected ions having orbital periods related to the selected ion by exponents of one half. Such non-selected ions have periods of one half, one quarter, one eighth, etc. of the selected ion's orbital period. These relationships may be derived from the expression:

$$v_a=(2QV_a/m)^{1/2}$$

where $v_a$ is the ion's velocity after acceleration, Q is the ion's charge, $V_a$ is the accelerating voltage and m is the ion's mass. For example, ions with four times the selected mass-to-charge ratio will orbit at half the period of the selected ions because they travel at half the angular velocity of ions having the selected mass-to-charge ratio. Ions with sixteen times the mass-to-charge ratio will orbit at one quarter the orbital period of ions having the selected mass-to-charge ratio, etc. With a single destabilization electrode, these related ions would travel along a stable orbital trajectory because they would always pass over electrodes 110 and 115 when they are at $V_{cont}$. In the illustrated embodiment, the second, out-of-phase destabilization electrode is placed exactly 180 degrees from the first destabilization electrode so those ions orbiting at these divisions of the orbital period of the selected ion will pass over one of the destabilization electrodes when it is at ground potential. The second out-of-phase destabilization electrode placed 180 degrees from the first ensures that a unique condition exists for each selected mass-to-charge ratio and that only the selected ions will pass over both destabilization electrodes when the electrodes are at $V_{cont}$ and thereby remain in stable orbits about axis 135. Destabilization of the orbits of ions having non-selected mass-to-charge ratios is illustrated in FIGS. 9 and 10. Such destabilized ions, identified generally at 175, are shown crashing into the interior electrode surface 140 of the outer electrode 95 in these figures.

Figure 11:
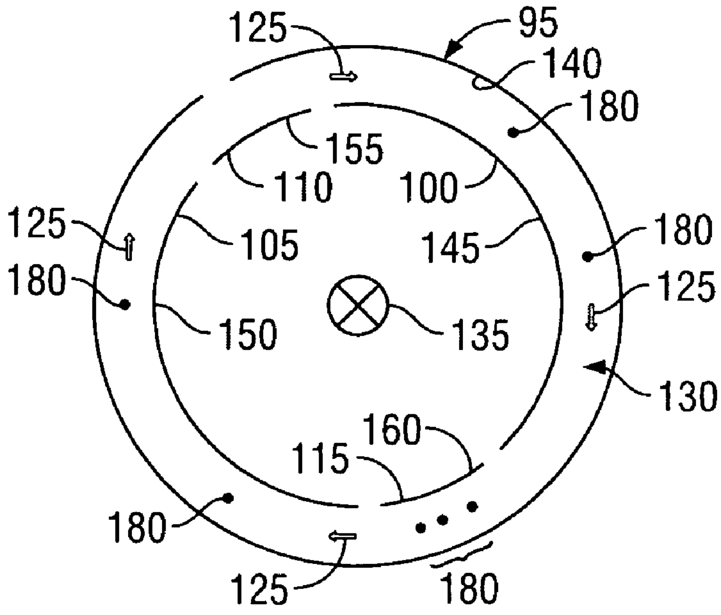

As shown in FIG. 11, only ions having the selected mass-to-charge ratio, identified generally at 180, will ultimately remain in stable orbits about axis 135. It is these ions that are to be detected. To this end, ion detection circuitry 40 is connected to count/detect the ions remaining in the ion selection unit 35 after the ions of non-selected mass-to-charged ratios have been removed from their orbit. This detection can be accomplished in a number of different manners. For example, once it is determined that only ions of the selected mass-to-charge ratio remain orbiting in region 130, the voltages to all of the inner electrodes 100, 105 110 and 115 may be brought to ground potential thereby destabilizing the orbits of the remaining ions and causing them to crash into the interior electrode surface 140 of the outer electrode 95. This destabilization of ions having the selected mass-to-charge ratio is shown in FIG. 12.

Figure 12:
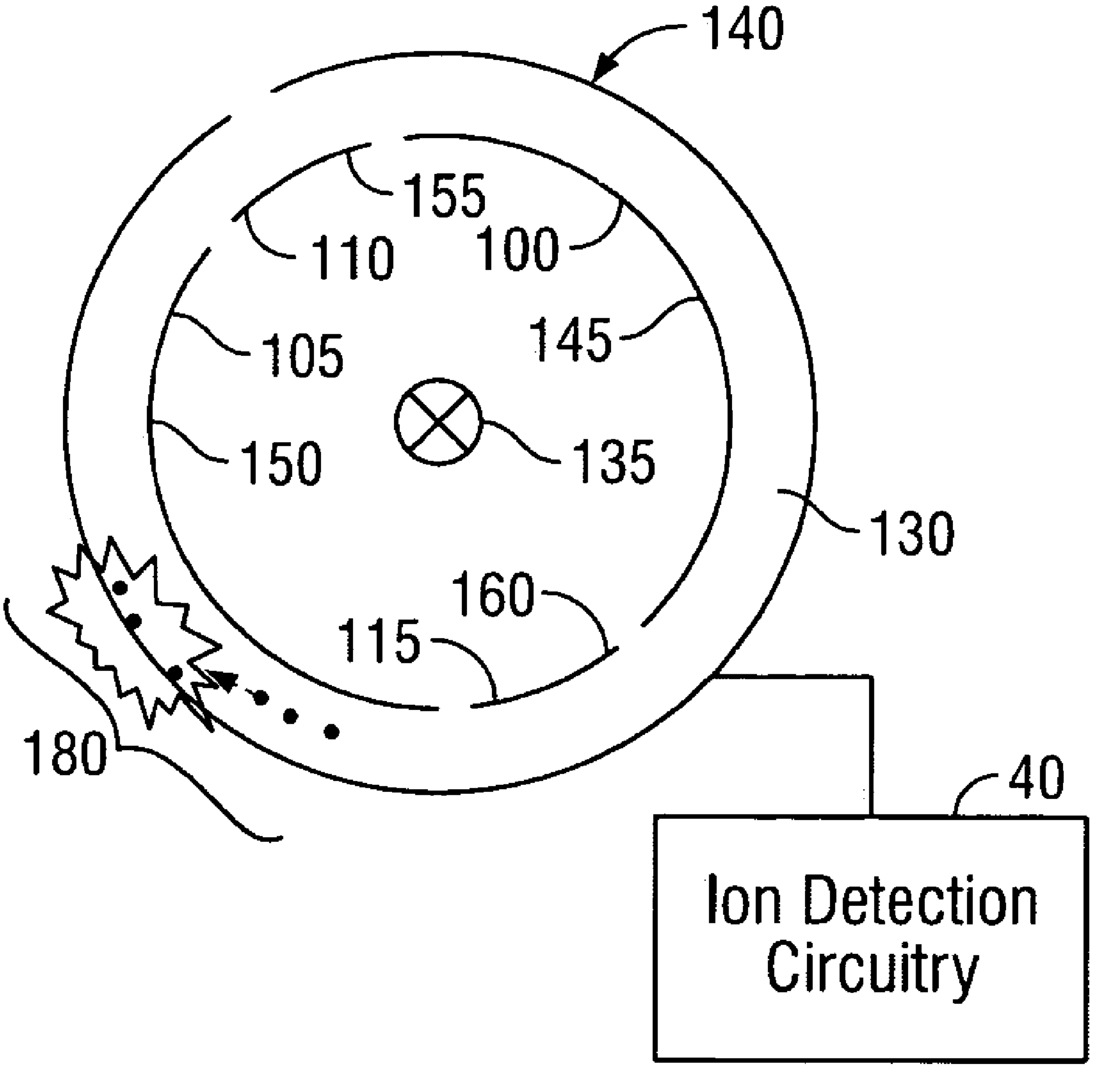

As illustrated in FIG. 12, the destabilized ions of the selected mass-to-charge ratio are detected by ion detection circuitry 40. Optionally, outer electrode 95 functions as part of the ion detection circuitry 40. When the ions of the selected mass-to-charge ratio crash into electrode 95, they induce a temporary current and/or charge on the electrode. This temporary current and/or charge is detected and/or counted by the remaining portions of the ion detection circuitry 40.

A complete mass spectrum for a sample is obtained by admitting a group of ions into the interstitial region 130, selecting a frequency for the voltage waveform applied to destabilization electrodes 110 and 115 corresponding to a specific orbital period for ions of a selected mass-to-charge ratio, waiting for the unstable ions of the non-selected mass-to-charge ratios to leave their orbit and then detecting/counting the remaining ions. This procedure is repeated for each mass-to-charge ratio in the range of interest. The speed of this type of analysis is determined by the velocity of the ions, with quicker analyses possible for ions having higher angular velocities. To increase the throughput of this type of system, a plurality of ion selection units 35 may be arranged in a parallel configuration to concurrently process different ranges of mass-to-charge ratios of interest. Alternatively, an ion selection unit with more than two destabilization electrodes may be useful to effect faster ion selection if very rapid operation is required. The oscillation of the voltage waveform used in such a configuration would be timed to follow the selected ions in their trajectory through interstitial region 130 at their orbiting velocity. All other ions having non-selected mass-to-charge ratios would be removed from orbit almost immediately since they would travel at a different velocity and would have orbital periods that are out of phase with the ions of the selected mass-to-charge ratio. The ion selection unit 35 could be configured so that the ions having non-selected mass-to-charge ratios would always be over an electrode when it was at ground potential. The arc length of each of the inner electrodes would be shorter in such instances. Consequently, more than one of the inner electrodes proximate the ion inlet would possibly need to be turned off during ion entry to ensure the existence of a field-free zone during ion insertion into the electric field at the desired point.

The ion selection unit 35 may be configured so that only DC power and switched DC power are used to accomplish ion selection. Ion selection may thus, if desired, be based on the velocity of the ions and not on the accelerations of the ions in an alternating electric fields. This reduces the complexity of the ion selection unit, makes it simple to operate and less expensive to manufacture when compared to many other mass filter designs. Further, it is believed that the sequence of ion trapping followed by ion selection makes the ion selection unit highly sensitive.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A mass analysis system comprising:

an ion injector providing a plurality of ions for analysis;

an ion selection chamber receiving the plurality of ions from the ion injector, the ion selection chamber having an axis, the ion selection chamber further having an outer electrode disposed about the axis, and a plurality of inner electrodes disposed about the axis, the plurality of ions being accepted from the ion injector into the interstitial region between the outer electrode and the plurality of inner electrodes; and a power supply system connected to the electrodes of the ion selection chamber, where the power supply system selectively provides a constant voltage between the outer electrode and the plurality of inner electrodes to allow ions having different orbital periods to enter a stable orbit about the axis, and where the power supply system also selectively provides a changing voltage between the outer electrode and at least one of the plurality of inner electrodes to facilitate separation of ions of a selected mass-to-charge ratio from ions of non-selected mass-to-charge ratios based on the orbital periods of said plurality of ions about the axis.

2. A mass analysis system as claimed in claim 1 wherein said power supply system operates to initially direct said plurality of ions into a stable trajectory about the axis in said interstitial region.

3. A mass analysis system as claimed in claim 2 wherein said changing voltage provided by said power supply system destabilizes the orbit of ions of non-selected mass-to-charge ratios while concurrently maintaining ions of said selected mass-to-charge ratio in a stable orbit.

4. A mass analysis system as claimed in claim 3 wherein said changing voltage provided by said power supply system operates to destabilize the orbit of ions of the selected mass-to-charge ratio after destabilization of the orbit of ions of non-selected mass-to-charge ratios.

5. A mass analysis system as claimed in claim 4 and further comprising an ion detector disposed to detect ions of the selected mass-to-charge ratio.

6. A mass analysis system as claimed in claim 5 wherein said ion detector comprises said outer electrode.

7. A mass analysis system as claimed in claim 1 wherein said changing voltage is a DC switched voltage.

8. A mass analysis system as claimed in claim 4 wherein said changing voltage is a DC switched voltage.

9. A mass analysis system as claimed in claim 1 wherein said plurality of inner electrodes comprises:

a first generally cylindrical inner electrode having at least one arcuate gap disposed along a length thereof;

a second inner electrode extending generally coextensive with said arcuate gap of said first inner electrode, the first and second inner electrodes and said outer electrode cooperating to form a substantially circular ion trajectory path about the axis in the interstitial region between said outer electrode and said inner electrodes.

10. A mass analysis system as claimed in claim 9 wherein said changing voltage is a DC switched voltage.

11. A mass analysis system as claimed in claim 1 wherein said plurality of inner electrodes comprises:

a first generally cylindrical inner electrode having first and second arcuate gaps disposed opposite one another and along a length of said first inner electrode;

a second inner electrode extending generally coextensive with said first arcuate gap;

a third inner electrode extending generally coextensive with said second arcuate gap, the first, second and third inner electrodes cooperating with said outer electrode to form a substantially circular ion trajectory path about the axis in the interstitial region between said outer electrode and said inner electrodes.

12. An ion selection apparatus for use in a mass analysis system, the ion selection apparatus comprising:

a first electrode having a cylindrical interior electrode surface;

a second electrode having an exterior electrode surface concentrically disposed with and facing said interior electrode surface of said first electrode, the exterior electrode surface of said second electrode being generally cylindrical with at least one arcuate gap disposed along a length thereof;

a third electrode having an exterior electrode surface concentrically disposed with and facing said interior electrode surface of said first electrode, the exterior electrode surface of said third electrode being generally coextensive with said arcuate gap of said second electrode;

a power supply system connected to said first, second and third electrodes, said power supply system providing a DC voltage between said interior electrode surface of said first electrode and said exterior electrode surface of said second electrode, said power supply system selectively providing a switched DC voltage between said interior electrode surface of said first electrode and said exterior electrode surface of said third electrode.

13. A method for detecting ions of a predetermined mass-to-charge ratio in a mass analysis system, the method comprising:

generating a plurality of ions for analysis;

directing the plurality of ions into a stable orbit about an axis within a substantially homogenous electric field;

introducing electric field perturbations to said substantially homogenous electric field so that only ions of said predetermined mass-to-charge ratio that have a predetermined orbital period about the axis remain in a stable orbit about the axis.

14. A method as claimed in claim 13 and further comprising the step of altering said substantially homogenous electric field so that the orbits of said ions of said predetermined mass-to-charge ratio are substantially destabilized to facilitate their detection.

15. A method for detecting ions as claimed in claim 14 and further comprising the step of detecting said ions of said predetermined mass-to-charge ratio as said ions leave said stable orbit.

16. A method for detecting ions as claimed in claim 13 wherein said electric field perturbations are periodic and predominantly effect the radio components of the substantially homogenous electric field.

17. A method for detecting ions as claimed in claim 13 wherein said electric field perturbations are generated by a switched DC voltage signal applied to one or more electrodes used to generate said generally homogenous electric field.

18. A method for detecting ions as claimed in claim 13 wherein said stable orbit is substantially circular.

19. A method for detecting ions of a predetermined mass-to-charge ratio in a mass analysis system, the method comprising:

generating a plurality of ions for analysis;

directing the plurality of ions into an interstitial region formed in a concentric electrode arrangement, said concentric electrode arrangement comprising an exterior electrode having a generally cylindrical interior region and a plurality of interior electrodes arranged to have a generally cylindrical surface facing the interior region of said exterior electrode, said interstitial region of said concentric electrode arrangement being disposed about an axis;

providing electrical power to said concentric electrode arrangement to generate a generally homogenous electric field in said interstitial region whereby said plurality of ions are directed into a substantially stable orbit in said interstitial region about the axis;

varying said electric power to said concentric electrode arrangement to introduce electric field perturbations in said substantially homogenous electric field whereby only ions of said predetermined mass-to-charge ratio that have a predetermined orbital period remain in a stable orbit about the axis.

20. A method for detecting ions as claimed in claim 19 and further comprising the steps of:

further varying said electric power to said concentric electrode arrangement to alter said substantially homogenous electric field so that ions of said predetermined mass-to-charge ratio leave said stable orbit; and detecting said ions of said predetermined mass-to-charge ratio.

21. A method for detecting ions as claimed in claim 20 wherein the step of detecting said ions comprises detecting said ions of said predetermined mass-to-charge ratio as said ions of said predetermined mass-to-charge ratio contact the interior region of said exterior electrode after leaving said stable orbit.

22. A method for detecting ions as claimed in claim 19 wherein said stable orbit is substantially circular.

23. A method for detecting ions as claimed in claim 21 wherein said stable orbit is substantially circular.

24. A method for detecting ions of a predetermined mass-to-charge ratio in a mass analysis system, the method comprising:

generating a plurality of ions for analysis;

trapping the plurality of ions into a stable orbit about an axis in an electric field formed between a plurality of concentric electrodes;

selectively removing ions having non-selected mass-to-charge ratios from the stable orbit based on the orbital period about the axis of the ions having the predetermined mass-to-charge ratio.

25. A method as claimed in claim 24 where the method further comprises removing ions having the predetermined mass-to-charge ratio from the stable orbit about the axis for detection.

* * * * *